United States Patent
Kumagai et al.

(10) Patent No.: US 8,307,058 B2
(45) Date of Patent: Nov. 6, 2012

(54) APPARATUS, METHOD, AND COMPUTER PROGRAM PRODUCT FOR PROCESSING INFORMATION

(75) Inventors: Kazuyuki Kumagai, Kagawa (JP); Hideaki Kumagai, legal representative, Kagawa (JP); Daisuke Sakai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 538 days.

(21) Appl. No.: 12/557,759

(22) Filed: Sep. 11, 2009

(65) Prior Publication Data
US 2010/0070972 A1 Mar. 18, 2010

(30) Foreign Application Priority Data
Sep. 16, 2008 (JP) ................................ 2008-236873

(51) Int. Cl.
G06F 15/173 (2006.01)
G06F 15/16 (2006.01)
G06F 15/177 (2006.01)
H04L 12/56 (2006.01)
H04H 20/28 (2008.01)
H04M 11/00 (2006.01)

(52) U.S. Cl. ..... 709/223; 709/203; 709/222; 370/395.3; 370/400; 370/486; 455/403

(58) Field of Classification Search ................. 709/203, 709/222, 223; 370/395.3, 400, 486; 455/403
See application file for complete search history.

(56) References Cited

U.S. PATENT DOCUMENTS

| | | | | |
|---|---|---|---|---|
| 5,465,330 A * | 11/1995 | Komatsu et al. | | 709/222 |
| 5,508,732 A * | 4/1996 | Bottomley et al. | | 725/93 |
| 5,987,430 A * | 11/1999 | Van Horne et al. | | 705/34 |
| 7,554,992 B2 * | 6/2009 | Kimura et al. | | 370/400 |
| 7,827,269 B2 * | 11/2010 | Anzai et al. | | 709/223 |
| 8,086,709 B2 * | 12/2011 | Danne et al. | | 709/223 |
| 2004/0152439 A1 * | 8/2004 | Kimura et al. | | 455/403 |
| 2005/0123001 A1 * | 6/2005 | Craven et al. | | 370/486 |
| 2005/0154790 A1 * | 7/2005 | Nagata et al. | | 709/223 |
| 2007/0150597 A1 * | 6/2007 | Hasan et al. | | 709/226 |
| 2007/0230477 A1 * | 10/2007 | Worley | | 370/395.3 |
| 2008/0280623 A1 * | 11/2008 | Danne et al. | | 455/453 |

FOREIGN PATENT DOCUMENTS

| | | |
|---|---|---|
| JP | 2003-122715 | 4/2003 |
| JP | 2008-176789 | 7/2008 |
| JP | 4190991 | 9/2008 |
| JP | 4291856 | 4/2009 |

* cited by examiner

Primary Examiner — David Lazaro
Assistant Examiner — Vitali Korobov
(74) Attorney, Agent, or Firm — Cooper & Dunham LLP

(57) ABSTRACT

Port numbers allocated to each HTTP server are registered in association with identification information of the corresponding HTTP server in a port managing table. A worker HTTP server refers to the port managing table and determines unique port numbers as internal ports thereof that do not overlap with port numbers allocated to other HTTP servers.

15 Claims, 11 Drawing Sheets

APPARATUS, METHOD, AND COMPUTER PROGRAM PRODUCT FOR PROCESSING INFORMATION

CROSS-REFERENCE TO RELATED APPLICATIONS

The present application claims priority to and incorporates by reference the entire contents of Japanese Patent Application No. 2008-236873 filed in Japan on Sep. 16, 2008.

BACKGROUND OF THE INVENTION

1. Field of the Invention

The present invention relates to a technology for developing web applications in a multiple virtual machine environment.

2. Description of the Related Art

In recent years, an office environment system is being built which allows client based customization by adding or deleting applications to provide an optimum office environment in response to requirements from various clients. The customization can be performed by adding a new application developed by a third-party vendor, which provides hardware components or software programs installable in an existing hardware and software configuration. However, it is obvious that such a newly added application should not undermine the basic functions of the system.

Usually, when an office environment system that allows client based customization is built in a process-based operating system (OS), such as UNIX (registered trademark), then the process is divided into an appropriate number of granules to make it robust against errors or exceptions. On the other hand, when Java (registered trademark) is used as the programming language for application development, then a plurality of applications need to be executed in a single virtual machine. In that case, it is not reasonable to divide the process in granules. Even so, to enhance the robustness of the office environment system, it can be built with two virtual machines where web applications for basic functionality are installed in one virtual machine and applications developed by third-party vendors are installed in the other virtual machine.

To build a web-based application runtime environment, it is necessary to set certain port numbers as external ports for receiving client requests from a client device. In that regard, Japanese Patent Application Laid-open No. 2005-092457 discloses an information processing apparatus having a net service functionality in which a protocol daemon receives client requests via a plurality of external ports and, based on application identification information included in each client request transfers the client requests to specific applications for processing.

Meanwhile, in a multiple virtual machine environment, if a single hyper text transfer protocol (HTTP) server is installed to supervise web applications of all virtual machines, then inter-process communication between the HTTP server and the web applications becomes necessary. Moreover, at the time of installing a new web application in a virtual machine, inter-process communication functionality needs to be added in that web application. That increases the workload of a developer.

As a solution to this problem, a multiple virtual machine environment has been proposed in which each virtual machine independently runs an HTTP server and only one of those HTTP servers can receive client requests from a client device. Upon receiving a client request, that particular HTTP server transfers the client request to another HTTP server that supervises a web application configured to process that particular client request. As each virtual machine independently supervises a web application, a client request can be processed only by transferring it to a suitable web application. That makes inter-process communication redundant and enables achieving reduction of the workload of a developer.

However, in a multiple virtual machine environment where each virtual machine independently runs an HTTP server, it is necessary to set certain port numbers as internal ports that are different from the port numbers set as external ports and that enable inter-server communication between the HTTP servers. Although it is possible to allow a user to manually set port numbers as internal ports, management of port numbers becomes complicated if the number of virtual machines is large or if port numbers for external ports are altered. Moreover, although the technology disclosed in Japanese Patent Application Laid-open No. 2005-092457 focuses on managing external ports, the relation between external ports and internal ports is not given due consideration.

SUMMARY OF THE INVENTION

It is an object of the present invention to at least partially solve the problems in the conventional technology.

According to an aspect of the present invention, there is provided an information processing apparatus that receives information from an external client device including an HTTP client, processes the information, and sends a processing result to the client device. The information processing apparatus includes a plurality of virtual machines each running an HTTP server, the HTTP server running in one of the virtual machines functioning as a master HTTP server that performs communication with the HTTP client and the HTTP server running in each of remaining virtual machines functioning as a worker HTTP server. The master HTTP server includes a port number setting unit that receives input settings including a port number to be used in communication with the HTTP client; and a port managing unit that manages port management information in which the port number received by the port number setting unit is registered in association with identification information of the master HTTP server and a port number for each of the worker HTTP servers is registered in association with identification information of corresponding worker HTTP server. The worker HTTP server includes a port determining unit that, by referring to port numbers registered in the port management information, determines a port number not allocated to any of remaining HTTP servers as an internal port of corresponding worker HTTP server and instructs the port managing unit to register determined port number in association with identification information of the corresponding worker HTTP server.

According to another aspect of the present invention, there is provided a method of information processing in an information processing apparatus that includes a plurality of virtual machines each running an HTTP server, the HTTP server running in one of the virtual machines functioning as a master HTTP server that performs communication with an external HTTP client and the HTTP server running in each of remaining virtual machines functioning as a worker HTTP server. The method includes a first process performed by the master HTTP server including receiving, by a port number setting unit, input settings including a port number to be used in communication with the HTTP client; and managing, by a port managing unit, port management information in which the port number received by the port number setting unit is registered in association with identification information of the master HTTP server and a port number for each of the worker HTTP servers is registered in association with identification information of corresponding worker HTTP server; and a second process performed by each of the worker HTTP servers including determining, by a port determining unit, a unique port number not allocated to any of remaining HTTP servers as an internal port of corresponding worker HTTP server by referring to port numbers registered in the port management information. The port number determined at the determining in the second process is registered in association with identification information of the corresponding worker HTTP server in the port management information at the managing in the first process.

According to still another aspect of the present invention, there is provided a computer program product including a computer-usable medium having computer-readable program codes embodied in the medium for processing information in an information processing apparatus that includes a plurality of virtual machines each running an HTTP server. The HTTP server running in one of the virtual machines functioning as a master HTTP server that performs communication with an external HTTP client and the HTTP server running in each of remaining virtual machines functioning as a worker HTTP server. The program codes when executed causing a computer to execute a first process performed by the master HTTP server including receiving, by a port number setting unit, input settings including a port number to be used in communication with the HTTP client; and managing, by a port managing unit, port management information in which the port number received by the port number setting unit is registered in association with identification information of the master HTTP server and a port number for each of the worker HTTP servers is registered in association with identification information of corresponding worker HTTP server; and a second process performed by each of the worker HTTP servers including determining, by a port determining unit, a unique port number not allocated to any of remaining HTTP servers as an internal port of corresponding worker HTTP server by referring to port numbers registered in the port management information; and instructing, by the port determining unit, the port managing unit to register determined port number in association with identification information of the corresponding worker HTTP server in the port management information.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings. The present invention is not limited to these exemplary embodiments.

Figure 1:
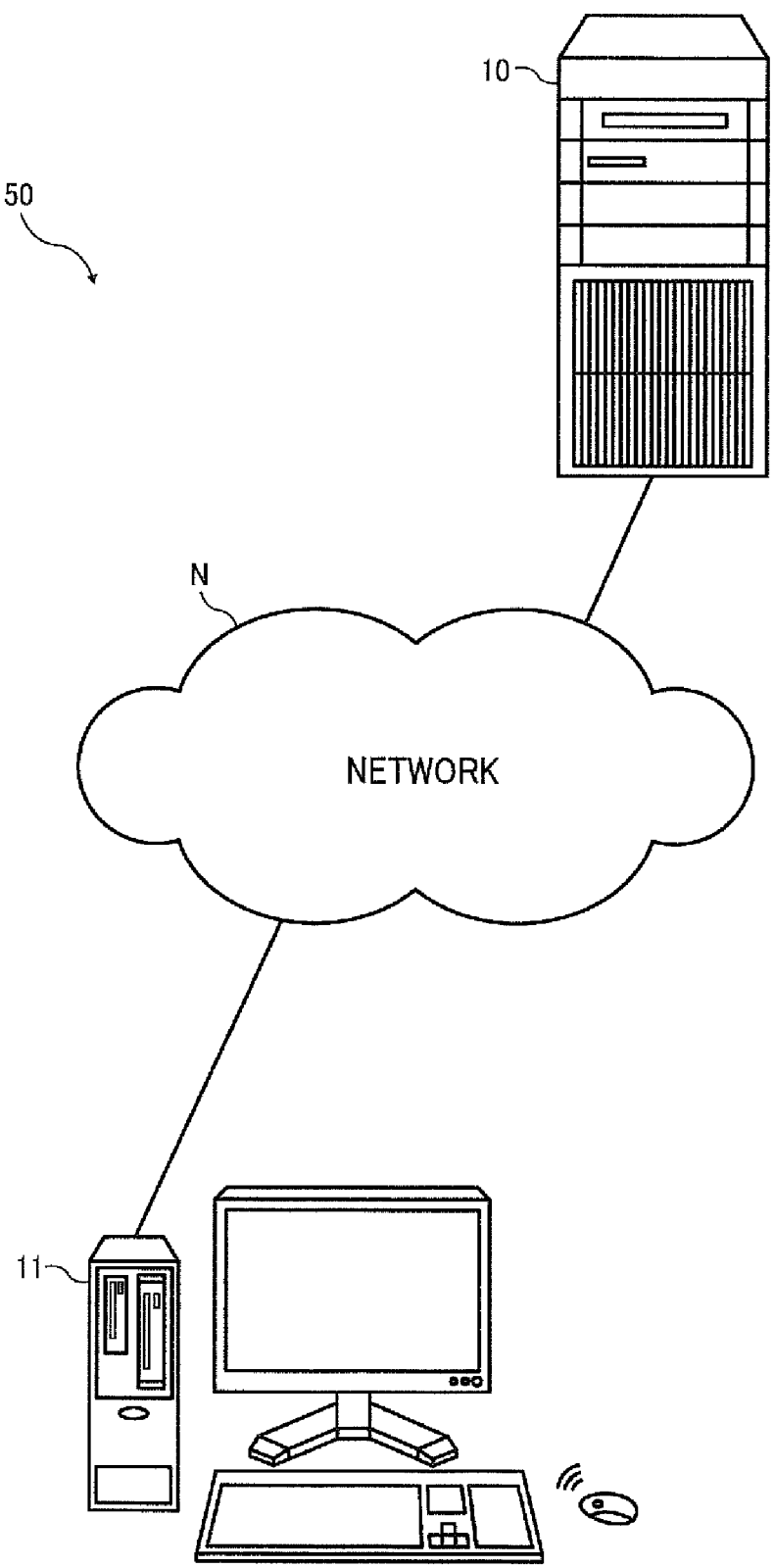
FIG. 1 is a schematic diagram of an exemplary network system according to an embodiment of the present invention.

FIG. 1 is a schematic diagram of an exemplary network system 50 according to an embodiment of the present invention. The network system 50 includes a server 10, which functions as an information processing apparatus, and a client device 11. The server 10 and the client device 11 can perform communication via a network N such as the Internet.

A web server program is installed in the server 10 and a web browser program is installed in the client device 11. The web browser program is a software program used in communication with the web server program via the network N. The web server program processes a client request received from the web browser program by executing a web application and sends back the result of the processing to the web browser program.

When a user specifies a uniform resource locator (URL) of a web page in a web browser program, the web browser program sends the URL as a client request to a web server program that corresponds to the domain specified in the URL. The web server program obtains from the URL a directory path of a file required to display the web page, retrieves the file from the directory, and sends it to the web browser program.

The communication between a web browser program and a web server program is performed by using a communication protocol such as hyper text transfer protocol (HTTP). A web browser program using HTTP for communication is known as an HTTP client, while a web server program using HTTP for communication is known as an HTTP server. Thus, the web browser program of the client device 11 and the web server program of the server 10 are hereinafter referred to as an HTTP client and an HTTP server, respectively. The HTTP server opens an external port to communicate with the HTTP client. Usually, the HTTP server has a single external port having a unique port number 80.

Meanwhile, each of the server 10 and the client device 11 can be a PC or an image forming apparatus that, as described later in detail, includes resources such as a central processing unit (CPU) for controlling operations, a memory unit for storing computer programs executed by the CPU, and a communication interface such as a network board or a network card. Meanwhile, although only one client device 11 is shown in FIG. 1, it is possible to arrange two or more client devices 11 that can separately send client requests to the server 10 via the network N.

Figure 2:
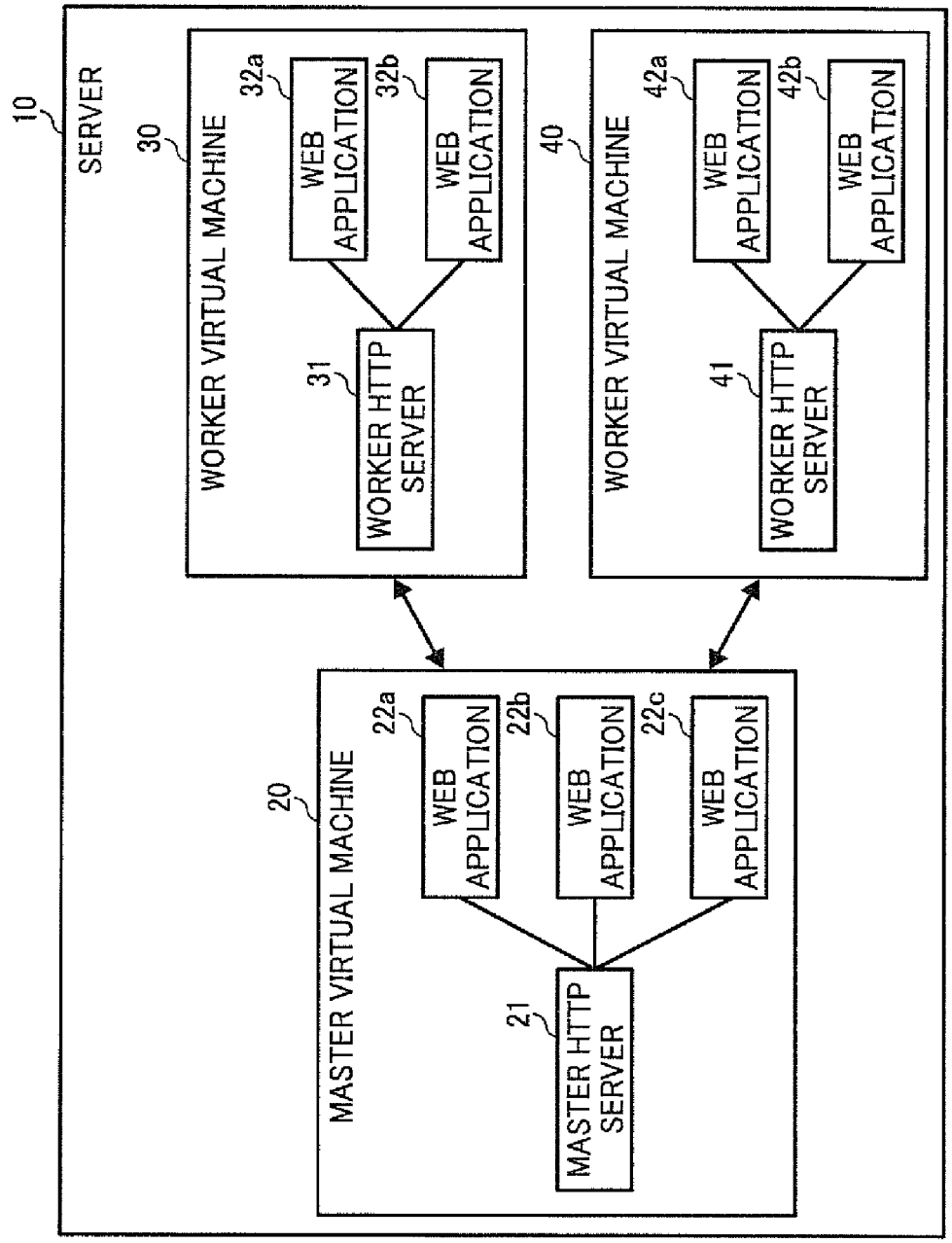
FIG. 2 is a schematic diagram of an exemplary modular configuration of an information processing apparatus shown in FIG. 1.

FIG. 2 is a schematic diagram of an exemplary modular configuration of the server 10. Usually, a server can be configured to include many virtual machines. In the example shown in FIG. 2, the server 10 is configured to include only three virtual machines 20, 30, and 40. A virtual machine is a software architecture that virtualizes the server by flexibly abstracting (dividing or integrating) the resources, such as CPUs and memories, of the server irrespective of the actual physical configuration and executes applications on an OS. An example of a virtual machine is a Java virtual machine that is written in the Java programming language. A Java virtual machine resides in the OS as an executable file. Upon execution, the Java virtual machine reads a class file and runs a method written in the class file.

It is possible to simultaneously activate two or more of the virtual machines 20, 30, and 40, each running an independent OS and executing various applications in the corresponding OS. The virtual machine 20 includes an HTTP server 21 and can execute three web applications 22a to 22c. Similarly, the virtual machine 30 includes an HTTP server 31 and can execute two web applications 32a and 32b, while the virtual machine 40 includes an HTTP server 41 and can execute two web applications 42a and 42b. Each of the HTTP servers 21, 31, and 41 has an identical program module; while each of the web applications 22a, 22b, 22c, 32a, 32b, 42a, and 42b has a different program module.

In the example shown in FIG. 2, it is assumed that the virtual machine 20 functions as a master virtual machine (hereinafter, "master virtual machine 20"), while the virtual machines 30 and 40 function as worker virtual machines (hereinafter, "worker virtual machines 30 and 40") for the master virtual machine 20. The master virtual machine 20 can communicate with the client device 11 by opening an external port (e.g., port number 80). As a result, the HTTP server 21 will be called the master HTTP server 21 and the HTTP servers 31, 41 will be called the worker HTTP servers 31, 41. Moreover, if a client request from the client device 11 includes address information (e.g., a URL) of a web application installed in a particular worker virtual machine, then the master virtual machine 20 transfers the client request to that worker virtual machine via a corresponding internal port. For example, if a client request includes address information of the web application 32a or the web application 32b installed in the worker virtual machine 30, then the master virtual machine 20 transfers the client request to the worker virtual machine 30. Similarly, if a client request includes address information of the web application 42a or the web application 42b installed in the worker virtual machine 40, then the master virtual machine 20 transfers the client request to the worker virtual machine 40.

Thus, the worker virtual machines 30 and 40 each receives a client request from the master virtual machine 20 via a corresponding internal port that is used exclusively for internal communication inside the server 10. Subsequently, the worker virtual machines 30 and 40 each executes the web application specified in the URL in the corresponding client request and sends back a processing result to the master virtual machine 20. Eventually, the master virtual machine 20 sends the processing results to the client device 11 via an open external port. The port numbers representing internal ports for each of the worker virtual machines 30 and 40 are uniquely determined in coordination with the master virtual machine 20. The details regarding port number determination are given later.

A web application on a Java platform is developed as a Java servlet or a Java server page (JSP). A Java servlet is a Java program executed in the web server program, while a JSP is a hyper text markup language (HTML) file in which a Java program is embedded. A web application is executed by using an application server, which corresponds to an HTTP server. An example of an application server is Tomcat (registered trademark), which provides an HTTP server environment for Java code to run. Similarly, an example of a web application framework is Struts (registered trademark), which is used to build web applications based on Java servlets or JSPs. More particularly, Struts is an open source library that provides basic operations such as data input-output, error processing, or screen transition of a Java program. An example of a basic platform to develop a Java-based web application is Java 2 Standard Edition (J2SE). The developed web applications are stored in a database.

With reference to FIG. 2, J2SE can be used as a Java virtual machine, while Tomcat can be used as an HTTP server. That is, Tomcat can be run in J2SE to read a web application and execute the Java servlets and the JSPs that configure the web application to process a client request. The processing result can then be sent to the HTTP client in the client device 11.

Thus, when an HTTP server is provided in each of a plurality of virtual machines, it is possible to independently develop web applications in each virtual machine. In that case, development of web applications in each virtual machine can be carried out without adding inter-process communication functionality in the web applications. That enables achieving reduction in the workload of a developer thereby enhancing the developing efficiency.

Figure 3:
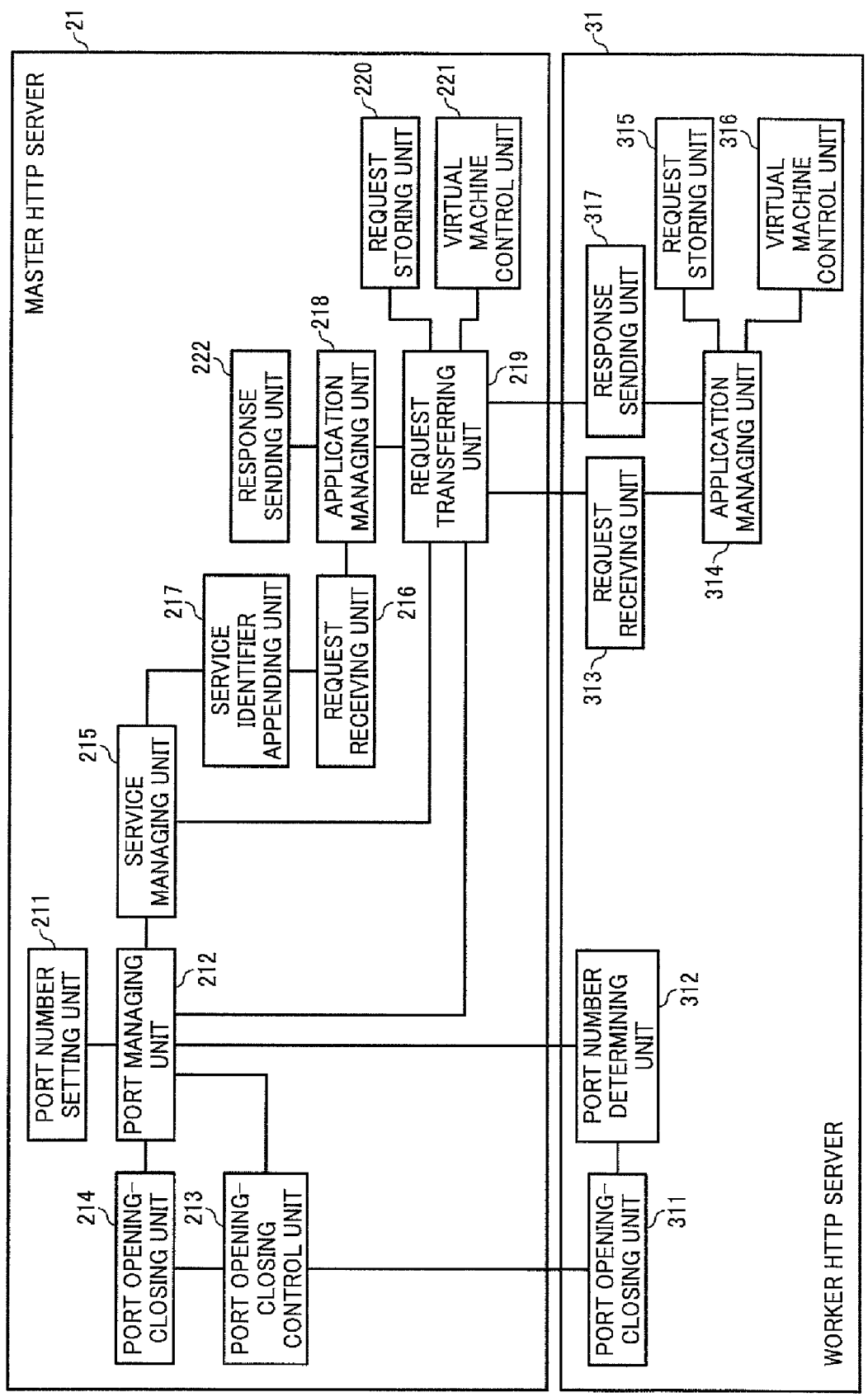
FIG. 3 is a schematic diagram of an exemplary functional configuration of an HTTP server shown in FIG. 2.

FIG. 3 is a schematic diagram of an exemplary functional configuration of the master HTTP server 21 installed in the master virtual machine 20 and the worker HTTP server 31 installed in the worker virtual machine 30. The functional relation between the constituent elements of the HTTP server 21 and the HTTP server 31 is explained with reference to FIG. 3. Meanwhile, the HTTP server 41 installed in the worker virtual machine 40 is assumed to have an identical configuration to that of the HTTP server 31 in the worker virtual machine 30. Hence, for clarity, the functional configuration of only the HTTP server 31 is described.

Although each of the HTTP servers 21, 31, and 41 has an identical program module, the master HTTP server 21 functions as a master HTTP server because it is installed in the master virtual machine 20; while the worker HTTP servers 31 and 41 function as worker HTTP servers because they are installed in the worker virtual machines 30 and 40. The master virtual machine 20 can be configured to include, for example, web applications for basic functionality. Similarly, the worker virtual machines 30 and 40 can be configured to include, for example, web applications for additional functionality developed by an administrator of the server 10 or web applications developed by a third party vendor.

Meanwhile, a master HTTP server or a worker HTTP server has the knowledge about the type of virtual machine (master or virtual) it belongs to. On the other hand, a web application is not limited by the type of virtual machine and can be managed by either one of a master HTTP server and a worker HTTP server. Thus, while developing a web application, there is no need to take into consideration the type of virtual machine in which it is to be executed.

As shown in FIG. 3, the master HTTP server 21 includes a port number setting unit 211, a port managing unit 212, a port opening-closing control unit 213, a port opening-closing unit 214, a service managing unit 215, a request receiving unit 216, a service identifier appending unit 217, an application managing unit 218, a request transferring unit 219, a request storing unit 220, a virtual machine control unit 221, and a response sending unit 222.

When a user issues an external-port setting request, or an external-port-setting alteration request, and inputs a new port number as an external port by using an input device 106 (described later) of the server 10, the port number setting unit 211 receives the issued request and sends the newly-input port number to the port managing unit 212. Meanwhile, herein it is assumed that more than one port numbers can be allocated as external ports to the master HTTP server 21.

Upon receiving the newly-input port number, the port managing unit 212 correspondingly registers that port number and identification information of the master HTTP server 21 in a port managing table maintained in a memory unit 104 (described later) of the server 10.

Upon registering the newly-input port number in association with the master HTTP server 21 in the port managing table, the port managing unit 212 notifies the service managing unit 215 of the newly-registered port number and issues a port closing instruction to the port opening-closing control unit 213.

Moreover, when the port managing unit 212 receives an inquiry from a port number determining unit 312 of the worker HTTP server 31 about whether a particular port number is available for registration as an internal port for the worker HTTP server 31, the port managing unit 212 checks whether the inquired port number overlaps with any of the port numbers already registered in the port managing table. If there is port overlapping, then the port managing unit 212 notifies the port number determining unit 312 of the same. On the other hand, if there is no port overlapping, then the port managing unit 212 correspondingly registers the inquired port number and identification information of the worker HTTP server 31 in the port managing table and notifies the port number determining unit 312 of the registration.

Every time the port managing table is updated, the port managing unit 212 notifies the service managing unit 215 of the updated content. More particularly, every time a port number is newly registered in the port managing table, the port managing unit 212 instructs the service managing unit 215 to register the service name of a service provided at that port number. Meanwhile, if the port number determining unit 312 requests for an association of a newly-registered port number with a particular port number that has been set as an external port, then the port managing unit 212 requests the service managing unit 215 to register the newly-registered port number in association with the service name of a service provided at the port number that has been set as an external port.

Figure 4:
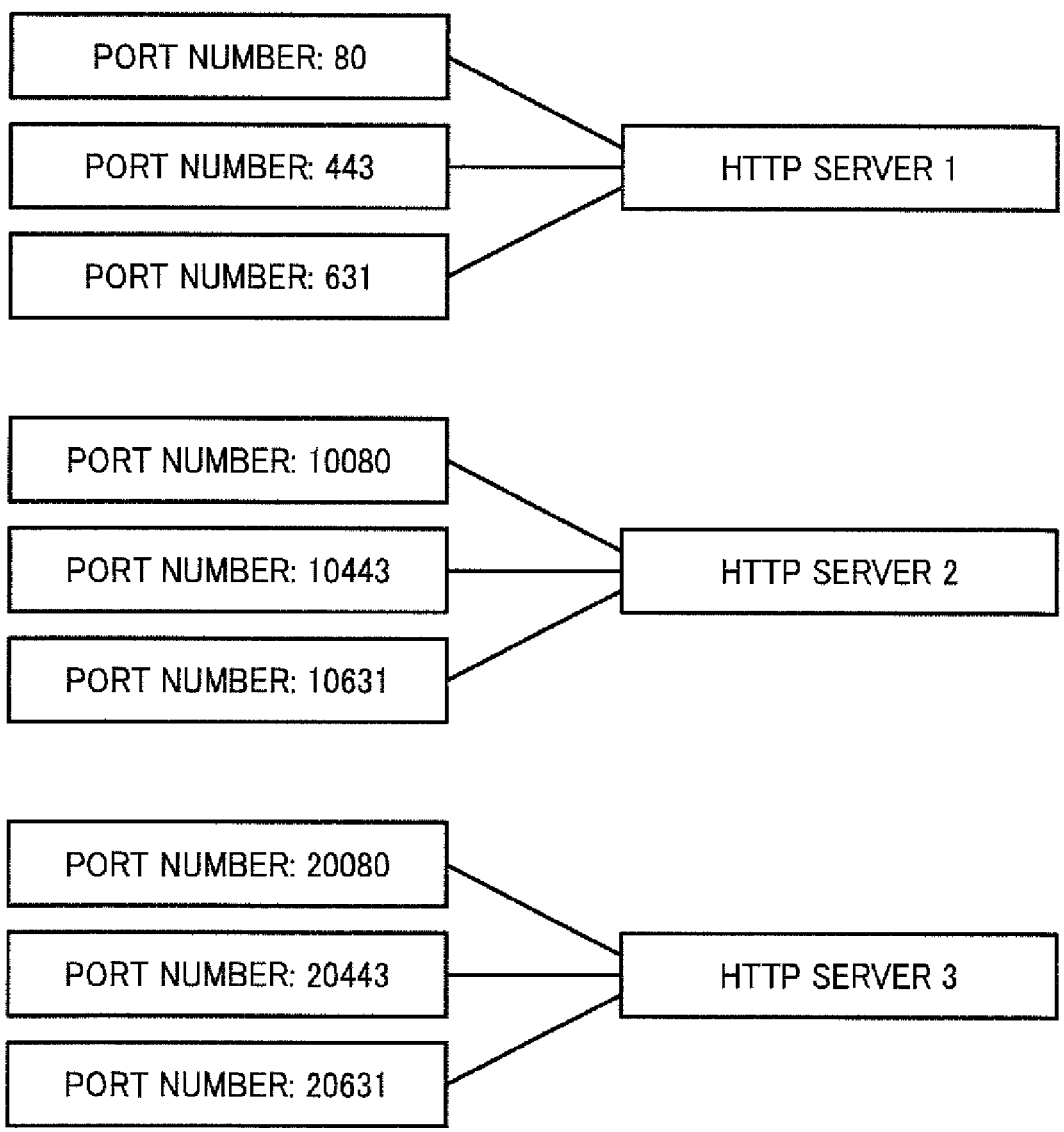
FIG. 4 is a schematic diagram of an exemplary port managing table managed by a port managing unit shown in FIG. 3.

FIG. 4 is a schematic diagram of an exemplary port managing table managed by the port managing unit 212. In the port managing table shown in FIG. 4, "HTTP server 1" represents the identification information of the master HTTP server 21 and three port numbers 80, 443, and 631 are registered in association with the identification information "HTTP server 1". Similarly, "HTTP server 2" represents the identification information of the worker HTTP server 31 and three port numbers 10080, 10443, and 10631 are registered in association with the identification information "HTTP server 2". Moreover, "HTTP server 3" represents the identification information of the worker HTTP server 41 and three port numbers 20080, 20443, and 20631 are registered in association with the identification information "HTTP server 3". In this way, the port managing unit 212 manages the list of port numbers allocated to the HTTP server in each virtual machine.

As shown in FIG. 4, the port numbers 10080 and 20080 represent internal ports that are allocated to the worker HTTP servers 31 and 41, respectively, and that correspond to the port number 80 representing an external port allocated to the master HTTP server 21. Similarly, the port numbers 10443 and 20443 represent internal ports that are allocated to the worker HTTP servers 31 and 41, respectively, and that correspond to the port number 443 representing an external port allocated to the master HTTP server 21. Moreover, the port numbers 10631 and 20631 represent internal ports that are allocated to the worker HTTP servers 31 and 41, respectively, and that correspond to the port number 631 representing an external port allocated to the master HTTP server 21.

Reverting to the description with reference to FIG. 3, the port opening-closing control unit 213 controls the port opening-closing unit 214 in performing port opening and port closing operations according to instructions from the port managing unit 212 and also controls a port opening-closing unit 311 of the worker HTTP server 31 in performing port opening and port closing operations.

Under the control of the port opening-closing control unit 213, the port opening-closing unit 214 performs opening and closing of the external ports allocated to the master HTTP server 21. An external port represents a port number used for communication between the server 10 and the client device 11, which is an external device, via the network N. When the port opening-closing control unit 213 issues a port opening instruction, the port opening-closing unit 214 reads the port numbers registered in association with the identification information of the master HTTP server 21 from the port managing table and opens those port numbers as external ports. Consequently, the client device 11 can communicate with the server 10 by accessing the open external ports.

The service managing unit 215 correspondingly registers a newly-registered port number notified by the port managing unit 212 and the service name of a service provided at that port number in a service managing table maintained in the memory unit 104.

More particularly, upon receiving a registration request from the port managing unit 212, the service managing unit 215 correspondingly registers a newly-registered port number notified by the port managing unit 212 and the service name of a service provided at that port number in the service managing table. Meanwhile, if the port managing unit 212 requests for an association of a target port number to be registered in the service managing table with a particular port number that has been registered in the service managing table, then the service managing unit 215 registers the target port number in association with the service name of a service provided at the port number that has been registered in the service managing table.

Figure 5:
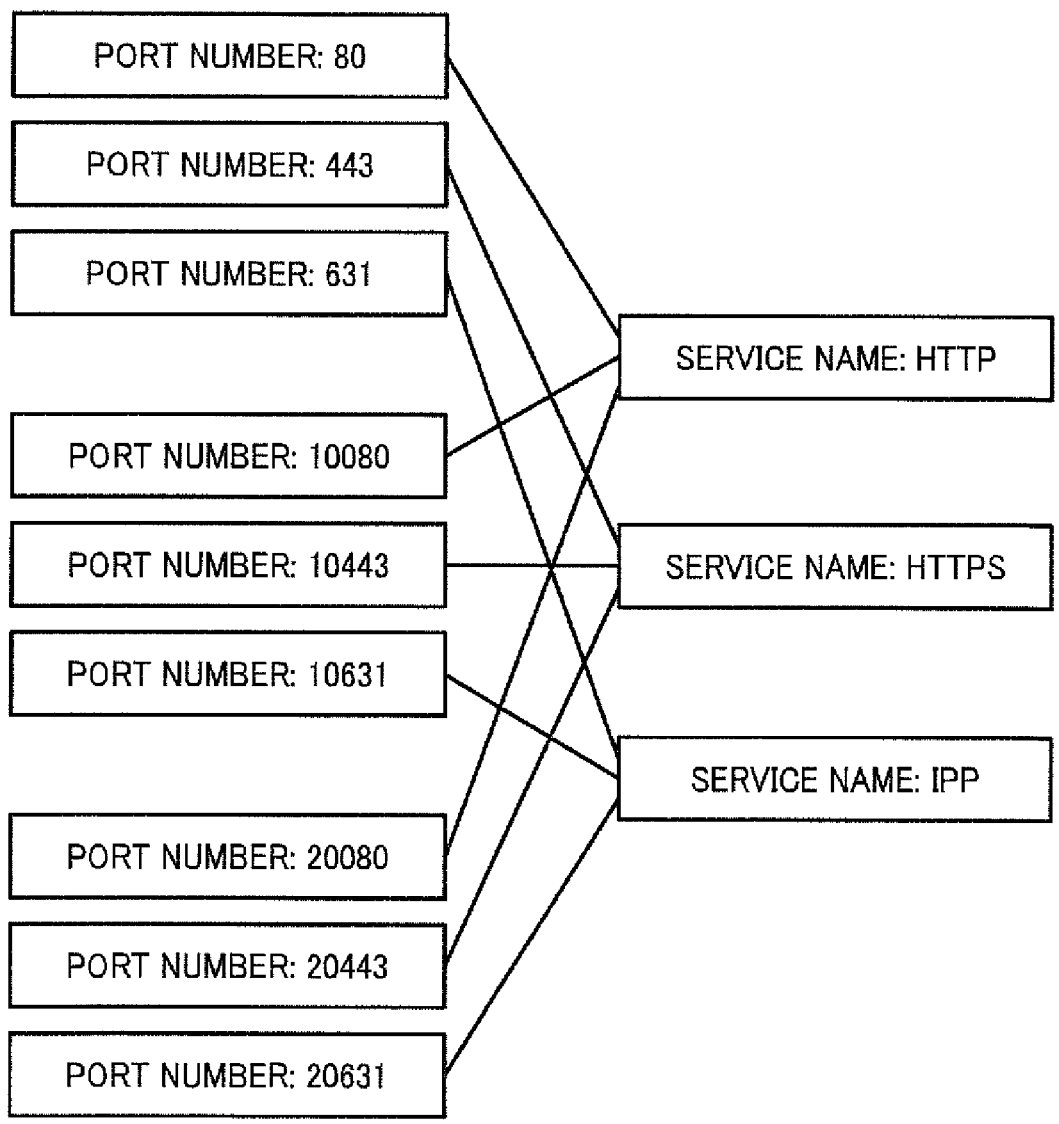
FIG. 5 is a schematic diagram of an exemplary service managing table managed by a service managing unit shown in FIG. 3.

FIG. 5 is a schematic diagram of an exemplary service managing table managed by the service managing unit 215. The service managing table shown in FIG. 5 corresponds to the port managing table shown in FIG. 4.

As shown in FIG. 5, the port numbers 80, 10080, and 20080 are registered corresponding to a service name "HTTP". Similarly, the port numbers 443, 10443, and 20443 are registered corresponding to a service name "HTTPS". Moreover, the port numbers 631, 10631, and 20631 are registered corresponding to a service name "IPP". In this way, the service managing unit 215 manages the list of port numbers allocated to the HTTP server in each virtual machine along with the service names of services provided at those port numbers.

Reverting to the description with reference to FIG. 3, the request receiving unit 216 receives a client request (HTTP request) from the client device 11 via an open external port for the master HTTP server 21 and sends the client request to the application managing unit 218.

The service identifier appending unit 217 extracts the port number via which the request receiving unit 216 receives a client request, identifies the service name of the service provided at that port number from the service managing table, and appends the service name as a service identifier to the client request. Thus, the application managing unit 218 receives the client request with the service identifier appended thereto.

For example, if the request receiving unit 216 receives a client request via the port number 80, then the service identifier appending unit 217 identifies the service name "HTTP" as the service name of the service provided at the port number 80 from the service managing table and appends a service identifier "Port-id: HTTP" as an independent header field in the header region of the client request.

The application managing unit 218 correspondingly stores in the memory unit 104 information on each web application executed by each virtual machine (the master virtual machine 20 and the worker virtual machines 30 and 40), the URL corresponding to that web application, the service provided by that web application, and, when the web application is installed in a worker virtual machine, the identification information of the corresponding worker HTTP server that functions as a window for transferring a client request to that web application. Hereinafter, the stored information is referred to as a correspondence table. Meanwhile, the operation of registering web applications in the application managing unit 218 is described later in detail.

Upon receiving a client request from the request receiving unit 216, the application managing unit 218 refers to the correspondence table and searches for a web application that corresponds to the URL specified in the client request. If the intended web application is installed in the master virtual machine 20, the application managing unit 218 sends a processing request to that web application. On the other hand, if the intended web application is installed in the worker virtual machine 30 or the worker virtual machine 40, the application managing unit 218 instructs the request transferring unit 219 to transfer the client request to the corresponding worker virtual machine.

Moreover, the application managing unit 218 receives a processing result of a client request from a corresponding web application in the master virtual machine 20 or from the request transferring unit 219, and forwards the processing result to the response sending unit 222.

Meanwhile, if a client request corresponds to a web application installed in a worker virtual machine, the request transferring unit 219 transfers the client request to the corresponding worker HTTP server under the control of the application managing unit 218.

More particularly, upon receiving an instruction from the application managing unit 218 to transfer a client request to a worker virtual machine, the request transferring unit 219 identifies, from the port managing table and the service managing table, a port number allocated as an internal port for the worker virtual machine to which the client request is to be transferred. For that, the request transferring unit 219 refers to the service identifier appended to the client request and the identification information of the worker HTTP server to which the client request is to be transferred. The request transferring unit 219 then transfers the client request to the identified internal port.

Meanwhile, if a web application that can process a client request is installed in more than one worker virtual machines, then the request transferring unit 219 selects one of those worker virtual machines based on priority information held in the master virtual machine 20 and sends the client request to the selected worker virtual machine.

After a web application installed in a particular worker virtual machine processes a client request, the request transferring unit 219 receives a processing response from a response sending unit of that worker virtual machine (a response sending unit 317 in the case of the worker virtual machine 30). The request transferring unit 219 then forwards the processing response to the application managing unit 218.

The request storing unit 220 stores a client request to be transferred to a worker virtual machine in a random access memory (RAM) 103 (described later) of the server 10 on a temporary basis and retrieves it in response to an instruction from the request transferring unit 219. Thus, the request storing unit 220 can be used in storing client requests for future transfers.

The virtual machine control unit 221 holds various information such as identification information indicating whether the corresponding virtual machine is a master virtual machine or a worker virtual machine and priority information indicating the priority of each virtual machine.

The response sending unit 222 receives a processing response corresponding to a client request from the application managing unit 218 and sends it to the client device 11 that had issued the client request.

Given below is the description with reference to FIG. 3 of an exemplary functional configuration of the worker HTTP server 31. The worker HTTP server 31 includes the port opening-closing unit 311, the port number determining unit 312, a request receiving unit 313, an application managing unit 314, a request storing unit 315, a virtual machine control unit 316, and the response sending unit 317.

The port opening-closing unit 311 performs opening and closing of the internal ports of the worker virtual machine 30 under the control of the port opening-closing control unit 213 present in the master HTTP server 21. More particularly, upon receiving a port opening instruction from the port opening-closing control unit 213, the port opening-closing unit 311 makes an inquiry to the port number determining unit 312 about target port numbers to be opened, and opens port numbers as responded by the port number determining unit 312. Meanwhile, an internal port represents a port number that enables the worker HTTP servers 31 and 41 to perform internal communication with the master HTTP server 21. The worker HTTP servers 31 and 41 can access the corresponding internal ports by using a loopback address. Because the internal ports are used exclusively for internal communication inside the server 10, the client device 11 cannot access the internal ports to perform direct communication with the worker HTTP servers 31 and 41.

Upon receiving an inquiry from the port opening-closing unit 311 about target port numbers to be opened, the port number determining unit 312 determines a port number corresponding to each port number that has been registered as an external port for the master HTTP server 21 in the port managing table, which is managed by the port managing unit 212. Then, the port number determining unit 312 makes an inquiry to the port managing unit 212 about whether the determined port numbers are available for registration as internal ports for the worker HTTP server 31.

More particularly, the port number determining unit 312 determines the port numbers from among port numbers 1 to 65535 in a random manner. However, it is desirable to leave out well known port numbers from 1 to 1023 during the random determination of port numbers. Moreover, it is also desirable to obtain information on port numbers allocated for other services (e.g., domain name system (DNS) service) of the server 10 and leave out those port numbers during the random determination of port numbers. Meanwhile, if the port managing table managed by the port managing unit 212 is made accessible to the port number determining unit 312, then the port numbers registered in the port managing table can also be left out during the random determination of port numbers.

Moreover, a port number can be so determined that the numerical value of the corresponding external port is included in the numerical value of the determined port number. For example, an internal port corresponding to the port number 80, which is set as an external port, can be determined by attaching a randomly decided numerical value such as "100" or "200" before the numerical value "80". In that case, the determined internal port has the port number 10080 or 20080.

If the port managing unit 212 notifies that a target port number for registration determined by the port number determining unit 312 overlaps with a port number already registered in the port managing table, the port number determining unit 312 randomly re-determines a new port number in place of the overlapping port number and makes an inquiry to the port managing unit 212 about whether the newly-determined port number is available for registration. In this way, in coordination with the master virtual machine 20, the port number determining unit 312 determines unique port numbers for the worker HTTP server 31 that do not overlap with port numbers allocated to other HTTP servers.

When the port managing unit 212 notifies that the port numbers randomly determined by the port number determining unit 312 have been registered as internal ports for the worker HTTP server 31 in the port managing table, the port number determining unit 312 notifies the port opening-closing unit 311 of the newly-registered port numbers. Subsequently, the port opening-closing unit 311 opens the newly-registered port numbers as unique internal ports for the worker HTTP server 31.

The request receiving unit 313 receives a client request from the master HTTP server 21 via an open internal port for the worker HTTP server 31 and sends the client request to the application managing unit 314.

The application managing unit 314 correspondingly stores information on each web application installed in the worker virtual machine 30, the URL corresponding to that web application, and the service provided by that web application in the form of a correspondence table in the memory unit 104. The correspondence table maintained by the application managing unit 314 is identical to the correspondence table maintained by the application managing unit 218; except that the correspondence table managed by the application managing unit 314 includes information on the web applications installed only in the worker virtual machine 30, as opposed to the correspondence table managed by the application managing unit 218 in which information on all web applications installed in each virtual machine is stored. Meanwhile, the operation of registering web applications in the application managing unit 314 is described later in detail.

Upon receiving a client request from the master HTTP server 21, the application managing unit 314 refers to the corresponding correspondence table and searches for a web application that corresponds to the URL specified in the client request and sends a processing request to that web application.

When the web application performs processing on the client request, the application managing unit 314 receives the processing result from the request receiving unit 313 and forwards the processing result to the request transferring unit 219 of the master HTTP server 21.

The request storing unit 315 stores the client request in the RAM 103 on a temporary basis and retrieves it in response to an instruction from the application managing unit 314.

The virtual machine control unit 316 holds various information such as identification information indicating whether the corresponding virtual machine is a master virtual machine or a worker virtual machine and priority information indicating the priority of each virtual machine.

The response sending unit 317 receives a processing response corresponding to a client request from the application managing unit 314 and sends it to the request transferring unit 219 of the master HTTP server 21.

Given below is the description of port opening and port closing operations performed by the HTTP servers in the server 10. First, the description is given about the operations performed in the server 10 when an external port is newly set. Meanwhile, because the worker virtual machine 30 and the worker virtual machine 40 perform identical operations, the following description is given only with reference to the worker virtual machine 30 for clarity.

Figure 6:
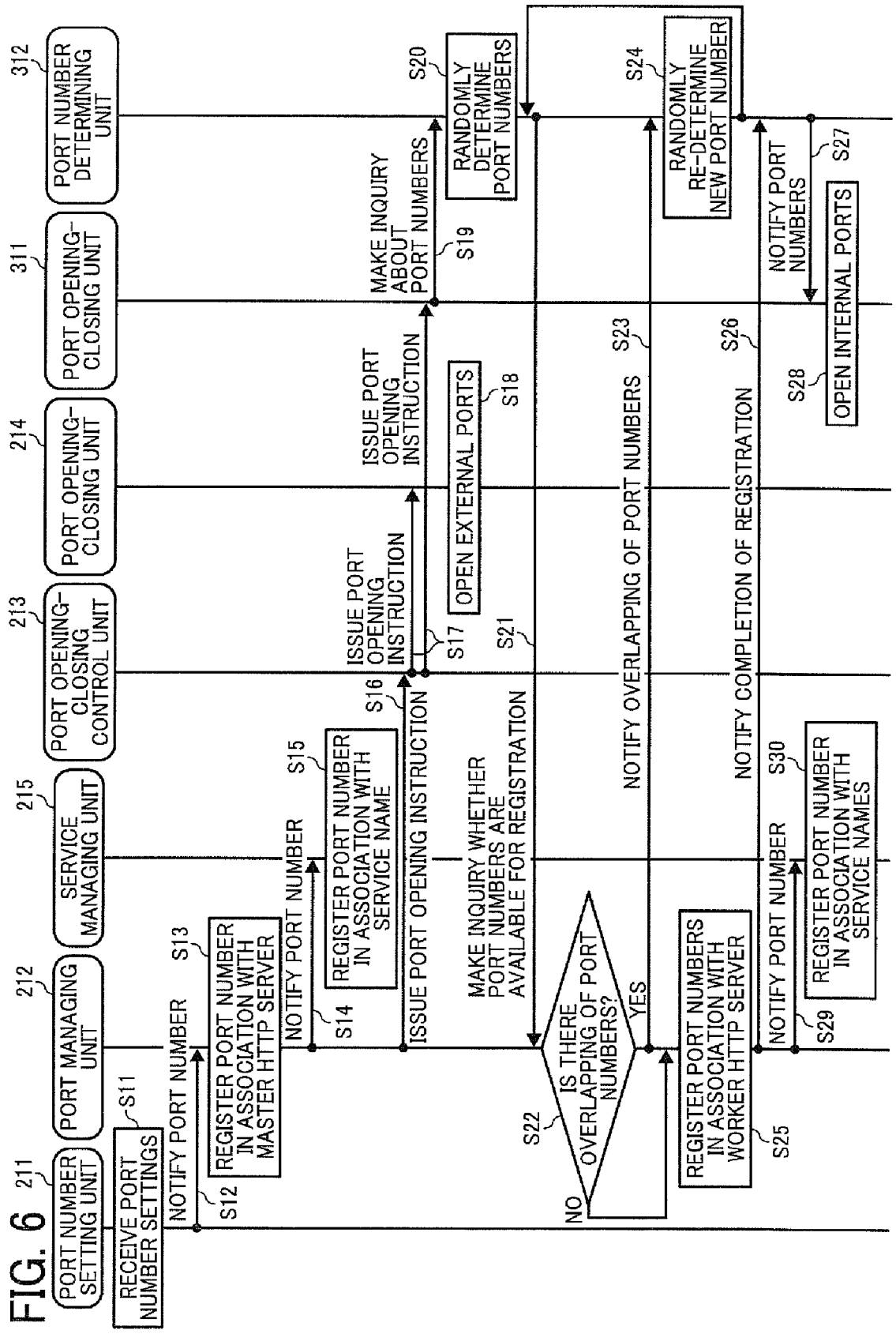
FIG. 6 is a sequence diagram for explaining operations performed in setting external and internal ports.

FIG. 6 is a sequence diagram for explaining the operations performed in the server 10 when an external port is newly set. First, when a user inputs a new port number as an external port by using the input device 106, the port number setting unit 211 in the master HTTP server 21 receives the input details (Step S11) and notifies the port managing unit 212 of the newly-input port number (Step S12).

The port managing unit 212 correspondingly registers the newly-input port number and the identification information of the master HTTP server 21 in the port managing table (Step S13). Every time a new port number is registered in the port managing table, the port managing unit 212 notifies the service managing unit 215 of the newly-registered port number and instructs the service managing unit 215 to register the service name of a service provided at that port number (Step S14).

The service managing unit 215 correspondingly registers the newly-registered port number notified by the port managing unit 212 and the service name of a service provided at that port number in the service managing table (Step S15). Meanwhile, if a newly-input port number is a known port number, the port number can be registered in association with a known service name or registered in association with a different service name specified by the user.

The port managing unit 212 issues a port opening instruction to the port opening-closing control unit 213 (Step S16).

Then, the port opening-closing control unit 213 instructs the port opening-closing unit 214 and the port opening-closing unit 311 in the worker HTTP server 31 to perform port opening (Step S17).

Under the control of the port opening-closing control unit 213, the port opening-closing unit 214 reads the port numbers registered in association with the identification information of the master HTTP server 21 from the port managing table and opens the port numbers as external ports (Step S18).

Upon receiving the instruction from the port opening-closing control unit 213, the port opening-closing unit 311 makes an inquiry to the port number determining unit 312 about target port numbers to be opened as internal ports (Step S19).

Subsequently, the port number determining unit 312 randomly determines port numbers corresponding to the port numbers that have been registered in association with the master HTTP server 21 in the port managing table (Step S20). Then, the port number determining unit 312 makes an inquiry to the port managing unit 212 about whether the randomly determined port numbers are available for registration as internal ports for the worker HTTP server 31 (Step S21). At that time, the port opening-closing unit 311 specifies the external port corresponding to each randomly determined port number to the port managing unit 212.

The port managing unit 212 determines whether the target port numbers for registration randomly determined by the port number determining unit 312 overlap with port numbers already registered in the port managing table (Step S22). If a target port number for registration overlaps with a port number already registered in the port managing table (Yes at Step S22), the port managing unit 212 notifies the port number determining unit 312 of the overlapping port number (Step S23).

In that case, the port number determining unit 312 randomly re-determines a new port number in place of the overlapping port number (Step S24) and makes an inquiry to the port managing unit 212 about whether the newly-determined port number is available for registration (Step S21).

On the other hand, if no target port number for registration overlaps with a port number already registered in the port managing table (No at Step S22), the port managing unit 212 correspondingly registers the target port numbers for registration and the identification information of the worker HTTP server 31 in the port managing table (Step S25) and notifies the port number determining unit 312 of the registration (Step S26).

The port number determining unit 312 then sends the newly-registered port numbers to the port opening-closing unit 311 (Step S27). Subsequently, the port opening-closing unit 311 opens the newly-registered port numbers as unique internal ports for the worker HTTP server 31 (Step S28).

Every time the port managing unit 212 registers a new port number in the port managing table in response to an inquiry from the port number determining unit 312, it also notifies the service managing unit 215 of the newly-registered port number and instructs the service managing unit 215 to register the service name of a service provided at that port number (Step S29). Meanwhile, if the port number determining unit 312 requests for an association of a newly-registered port number with a particular port number that has been set as an external port, then the port managing unit 212 requests the service managing unit 215 to register the newly-registered port number in association with the service name of a service provided at the port number that has been set as an external port.

Accordingly, the service managing unit 215 registers in the service managing table the newly-registered port number in association with the service name of the service provided at the specified port number that has been set as an external port for the master HTTP server 21 (Step S30).

In this way, the port managing table shown in FIG. 4 is managed and updated by the port managing unit 212; while the service managing table shown in FIG. 5 is managed and updated by the service managing unit 215. Moreover, for each worker virtual machine, unique port numbers registered in the port managing table are opened as internal ports.

Given below is the description of operations performed in the server 10 when existing external port settings are altered. Meanwhile, because the worker virtual machine 30 and the worker virtual machine 40 perform identical operations, the following description is given only with reference to the worker virtual machine 30 for clarity.

Figure 7:
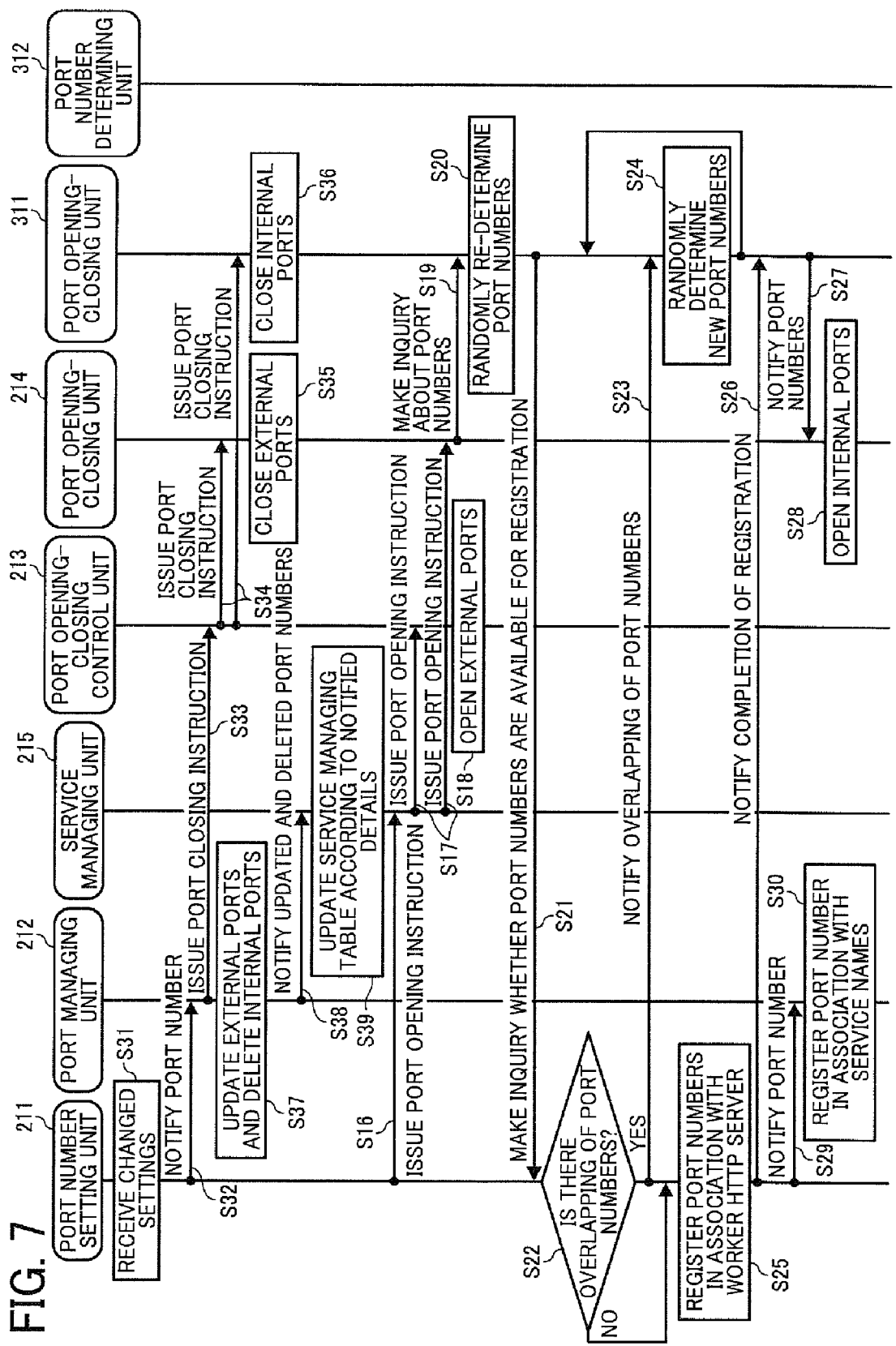
FIG. 7 is a sequence diagram for explaining operations performed when existing external port settings are altered.

FIG. 7 is a sequence diagram for explaining the operations in the server 10 when existing external port settings are altered. First, when the user inputs a new port number as a replacement for an existing external port by using the input device 106, the port number setting unit 211 in the master HTTP server 21 receives the input details (Step S31) and notifies the port managing unit 212 of the newly-input port number and the existing port number that is to be replaced (Step S32).

The port managing unit 212 then issues a port closing instruction to the port opening-closing control unit 213 (Step S33). The port opening-closing control unit 213 instructs the port opening-closing unit 214 and the port opening-closing unit 311 in the worker HTTP server 31 to perform port closing (Step S34).

The port opening-closing unit 214 then closes the existing external ports (Step S35) and the port opening-closing unit 311 closes the existing internal ports (Step S306).

Based on the input details, the port managing unit 212 updates entries regarding the external ports in the port managing table and deletes all entries regarding the internal ports registered in association with the identification information of the worker HTTP server 31 (Step S37). Meanwhile, if the newly-input port number does not overlap with any other port number registered in the port managing table, then it is not necessary to delete the entries regarding the internal ports from the port managing table. Moreover, instead of deleting all entries regarding the internal ports, only a port number that has been registered as an internal port but that overlaps with the newly-input port number can be deleted from the port managing table.

The port managing unit 212 notifies the service managing unit 215 of the updated content in the port managing table (Step S38). Accordingly, the service managing unit 215 updates the service managing table (Step S39). The subsequent operations are identical to those explained at Steps S16 to S30 with reference to FIG. 6. Hence, that description is not repeated.

Meanwhile, if entries regarding one or more internal ports allocated to the worker HTTP server 31 are deleted from the port managing table in the updating process, then the port number determining unit 312 randomly determines port numbers in place of the deleted port numbers. Moreover, if the updated port managing table still includes port numbers registered in association with the worker HTTP server 31, then the port number determining unit 312 can notify the port opening-closing unit 311 of those port numbers for continual usage. Alternatively, the port number determining unit 312 can newly determine port numbers to replace the existing port numbers and make an inquiry to the port managing unit 212 about whether the newly-determined port numbers are available for registration as internal ports for the worker HTTP server 31.

In this way, when a newly-input port number replaces an existing port number as an external port, it is made sure that the internal ports for each of the worker HTTP servers 31 and 41 do to overlap with the newly-input port number. That allows the worker HTTP servers 31 and 41 to continually perform internal communication via corresponding unique internal ports.

Given below is the description with reference to FIG. 8 of a process of registering a web application that has been installed in the master virtual machine 20 in the master HTTP server 21. Herein, it is assumed that the external ports for the master HTTP server 21 and the internal ports for the worker HTTP server 31 and 41 are already set.

Registration of a web application means registration of a URL corresponding to that web application in the master HTTP server 21. Meanwhile, because the process of registering each of the web applications 22a to 22c is identical, the following description is given for registering only the web application 22a.

Figure 8:
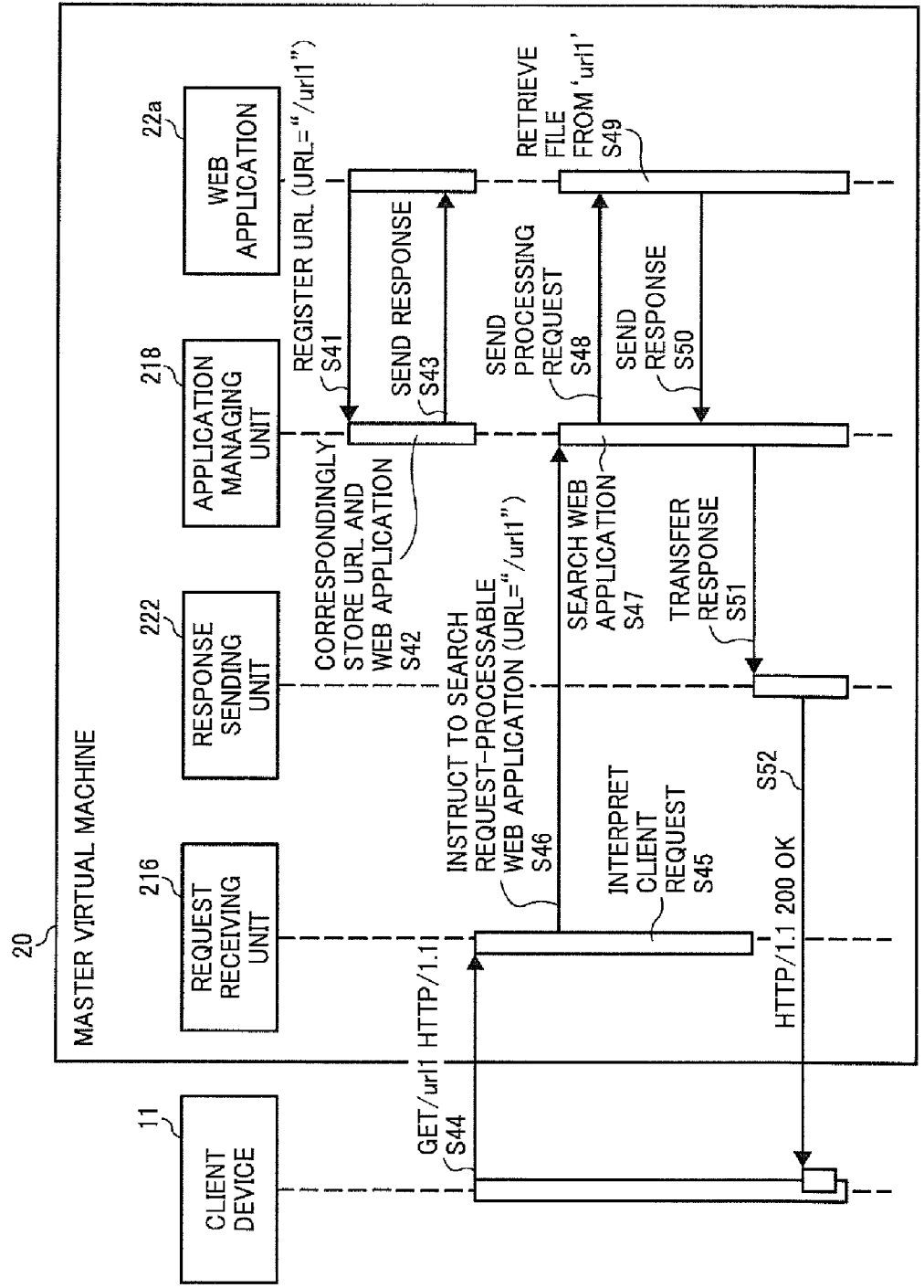
FIG. 8 is a sequence diagram for explaining a process of registering a web application in a master HTTP server and processing a client request.

With reference to FIG. 8, the web application 22a sends a registration request to the master HTTP server 21 for registering a corresponding URL "/url1" (Step S41). The application managing unit 218 of the master HTTP server 21 then correspondingly registers the web application 22a and the URL "/url1" (Step S42).

Subsequently, the application managing unit 218 sends a registration response to the web application 22a (Step S43).

Consider a case when an HTTP client of the client device 11 sends a client request 'GET/url1 HTTP/1.1' to the master virtual machine 20 (Step S44). The request receiving unit 216 receives and interprets the client request (Step S45). Herein, the client request 'GET/url1 HTTP/1.1' is interpreted as 'retrieve the file from the address specified in the URL "/url1" by using the transfer protocol HTTP/1.1'. Subsequently, the request receiving unit 216 sends the client request to the application managing unit 218 and instructs the application managing unit 218 to search for a web application that can retrieve the file from the address specified in the URL "/url1" (Step S46). Meanwhile, as described above, the application managing unit 218 receives the client request with a service identifier appended thereto by the service identifier appending unit 217.

The application managing unit 218 then refers to the correspondence table and searches for a web application that corresponds to the URL "/url1" (Step S47). Upon finding the web application 22a as the intended web application, the application managing unit 218 sends a processing request to the web application 22a (Step S48). Subsequently, the web application 22a retrieves the file from the address specified in the URL "/url1" (Step S49) and sends a response to the application managing unit 218 (Step S50).

Herein, it is assumed that a web application processes a client request depending to the service identifier appended to the client request. For example, consider a situation where, on the one hand, the user is allowed to operate the input device to configure as well as to refer to the settings for enabling/disabling external ports; while, on the other hand, the user is allowed to operate the web browser program only to refer to the settings for disabling external ports but not to configure those settings. In that case, if a web application for external port settings determines that the service identifier in a client request indicates HTTP, then the web application processes the client request according to predetermined control rules such that the external port settings are made available only for reference and not for configuration.

Upon receiving the response from the web application 22a, the application managing unit 218 transfers it to the response sending unit 222 (Step S51). In turn, the response sending unit 222 sends the response to the HTTP client of the client device 11 (Step S52).

In the example shown in FIG. 8, the response includes a message 'HTTP/1.1 200 OK', where 'HTTP/1.1' is the transfer protocol and '200' is the HTTP status code indicating that the file retrieval is successful. The response also includes the retrieved file from the address specified in the URL "/url1". When the HTTP client of the client device 11 receives the response from the master HTTP server 21, a web page corresponding to the retrieved file is displayed on a display screen (not shown) of the client device 11.

Figure 9:
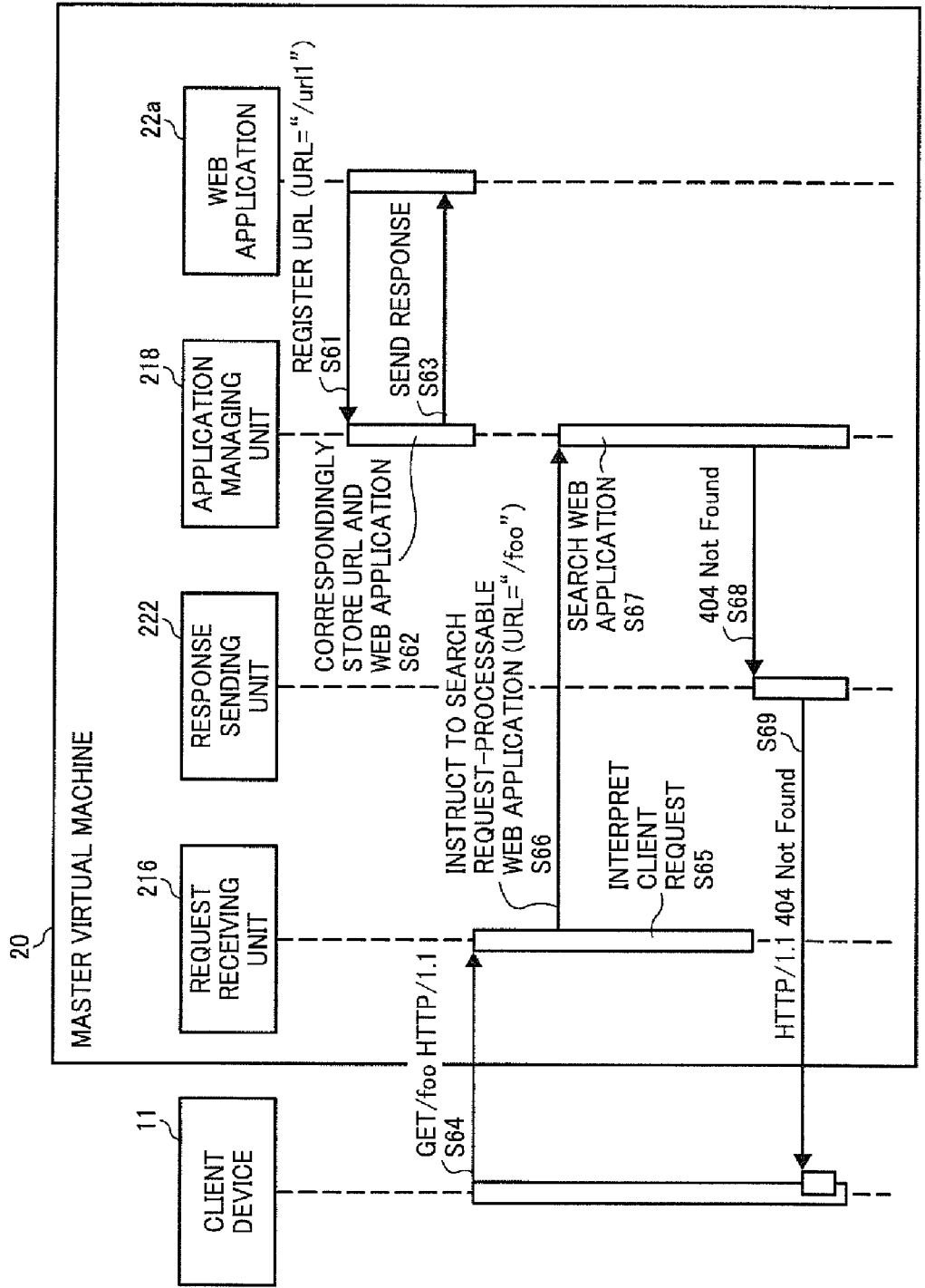
FIG. 9 is a sequence diagram for explaining a situation where a web application that processes client requests is not installed in the master virtual machine.

Meanwhile, if, at Step S47, a web application that can retrieve a file from the address specified in a requested URL is not found in the master virtual machine 20, then an error message about the failure in finding the web application is sent as a response to the client device 11. FIG. 9 is a sequence diagram for explaining a case when a web application that can retrieve a file from the address specified in a requested URL is not installed in the master virtual machine 20. Steps S61 to S66 in FIG. 9 are identical to Steps S41 to S46 in FIG. 8. Hence, their description is not repeated.

Upon receiving a client request from the request receiving unit 216 (Step S66), the application managing unit 218 refers to the correspondence table and searches for a web application that can retrieve a file from the address specified in a client request 'GET/foo HTTP/1.1' (Step S67). It is assumed that the application managing unit 218 cannot find an intended web application in the master virtual machine 20. Thus, the application managing unit 218 creates an error message '404 Not Found' and sends the error message to the response sending unit 222 (Step S68).

In turn, the response sending unit 222 sends the error message to the HTTP client in the client device 11 (Step S69). In the error message '404 Not Found', '404' is an HTTP status code indicating that the resource information corresponding to the URL 'foo' is not found. When the HTTP client in the client device 11 receives the error message, the user of the client device 11 is informed that the desired resource information is not found.

Figure 10:
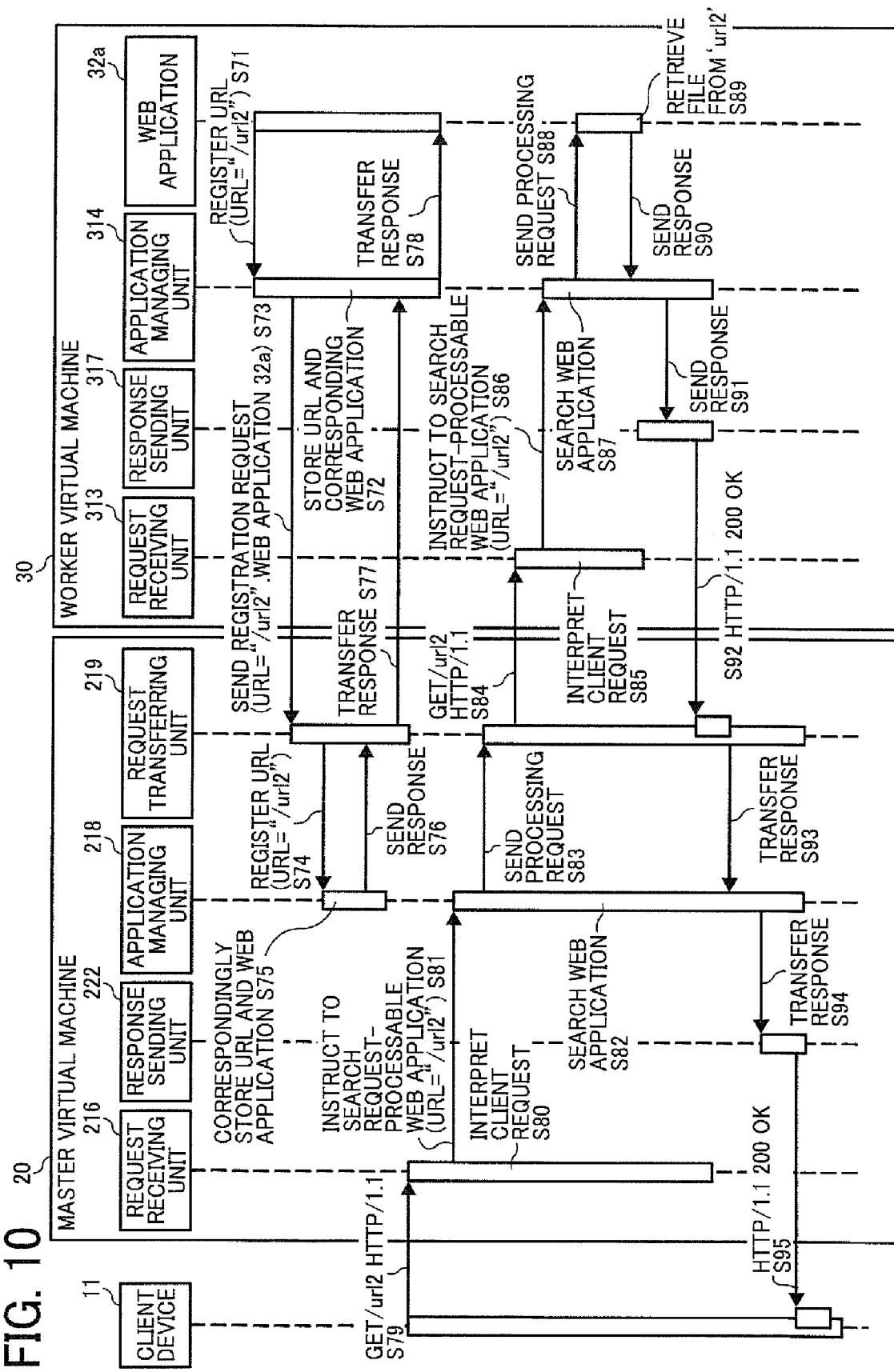
FIG. 10 is a sequence diagram for explaining a process of registering a web application in a worker HTTP server and processing a client request.

FIG. 10 is a sequence diagram for explaining a process of registering the web application 32a that has been installed in the worker virtual machine 30 in the worker HTTP server 31.

First, the web application 32a sends a registration request to the worker HTTP server 31 for registering a corresponding URL "/url2" (Step S71). The application managing unit 314 of the worker HTTP server 31 then correspondingly registers the web application 32a and the URL "/url2" (Step S72).

The worker HTTP server 31 refers to the virtual machine control unit 316 and determines whether it belongs to a master virtual machine or a worker virtual machine. When it is determined that the worker HTTP server 31 belongs to the worker virtual machine 30, the worker HTTP server 31 makes a remote procedure call (RPC) to the master HTTP server 21. An RPC is a protocol that one program can use to request a service from a program located at another address space in a network without having to understand network details. The RPC made to the master HTTP server 21 includes information about the URL "/url2" and the web application 32a.

In this way, use of an RPC allows the worker HTTP server 31 to dynamically register the URL "/url2" in the master HTTP server 21. Thus, even when a new web application is developed for the worker HTTP server 31 (or for the worker HTTP server 41), there is no need to make any modifications in the master HTTP server 21. That reduces the workload of a developer in developing web applications thereby enhancing the developing efficiency.

In the master HTTP server 21, the request transferring unit 219 receives the registration request and transfers it to the application managing unit 218 (Step S74). The application managing unit 218 stores in the correspondence table the information included in the registration request in association with the identification information of the worker HTTP server 31 (Step S75) and sends a storage completion response to the request transferring unit 219 (Step S76). In turn, the request transferring unit 219 transfers the storage completion response to the application managing unit 314 (Step S77).

Subsequently, the application managing unit 314 sends the storage completion response to the web application 32a (Step S78). That marks the completion of the registration process. Meanwhile, the process of registering the web application 32b in the worker HTTP server 31 or the process of registering the web applications 42a and 42b in the worker HTTP server 41 is also performed in an identical manner.

Consider a case when the HTTP client in the client device 11 sends a client request 'GET/url2 HTTP/1.1' to the master virtual machine 20 (Step S39). The request receiving unit 216 receives and interprets the client request (Step S80). Herein, the client request 'GET/url2 HTTP/1.1' is interpreted as 'retrieve the file from the address specified in the URL "/url2" by using the transfer protocol HTTP/1.1'.

Subsequently, the request receiving unit 216 sends the client request to the application managing unit 218 (Step S81) and instructs the application managing unit 218 to search for a web application that can retrieve the file from the address specified in the URL "/url2" (Step S82). As described above, the application managing unit 218 receives the client request with a service identifier appended thereto by the service identifier appending unit 217.

However, the web application corresponding to the "/url2" is the web application 32*a*, which is installed in the worker virtual machine 30. Thus, the application managing unit 218 cannot find the web application 32*a* in the master virtual machine 20. Consequently, the application managing unit 218 instructs the request transferring unit 219 to transfer the client request to the worker HTTP server 31 (Step S83).

Subsequently, the request transferring unit 219 identifies, from the port managing table and the service managing table, a port number allocated as an internal port for the worker virtual machine 30. For that, the request transferring unit 219 refers to the service identifier appended to the client request and the identification information of the worker HTTP server 31. The request transferring unit 219 then transfers the client request to the identified internal port for the worker HTTP server 31 (Step S84).

Meanwhile, because of the HTTP format of a client request transferred from the master HTTP server 21, the worker HTTP servers 31 and 41 are able to treat the client request as if it is received from a commonly-used web browser program. Thus, there is no need to make any particular modifications in the worker HTTP servers 31 and 41 for processing the client request. Moreover, as described above, the worker HTTP servers 31 and 41 communicate only with the master HTTP server 21 by using a loopback address. Thus, the client device 11 is blocked from directly communicating with the worker HTTP servers 31 and 41. That limits the necessity of security measures only to the master HTTP server 21 thereby reducing the load on the overall security system of the server 10.

The request receiving unit 313 of the worker HTTP server 31 receives and interprets the client request (Step S85), and sends it to the application managing unit 314 (Step S86).

The application managing unit 314 then refers to the correspondence table managed by itself and searches for a web application corresponding to the URL "/url2" (Step S87). Upon finding the web application 32*a* as the intended web application, the application managing unit 314 sends a processing request to the web application 32*a* (Step S88).

Subsequently, the web application 32*a* retrieves the file from the address specified in the URL "/url2" (Step S89) and sends a response to the application managing unit 314 (Step S90). Meanwhile, the web application 32*a* processes a client request depending on the service identifier appended to the client request.

The application managing unit 314 then transfers the response to the response sending unit 317 (Step S91). In turn, the response sending unit 317 sends the response to the request transferring unit 219 of the master HTTP server 21 (Step S92).

In the master HTTP server 21, the request transferring unit 219 transfers the response to the response sending unit 222 via the application managing unit 218 (Steps S93 and S94). The response sending unit 222 sends the response to the HTTP client in the client device 11 (Step S95).

In this way, upon receiving a client request from the HTTP client in the client device 11, the master HTTP server 21 determines a worker virtual machine that includes the web application corresponding to the URL (address information) specified in the client request by referring to URLs (address information) of web applications installed in each worker virtual machine, the information in the port managing table about the port numbers of each worker virtual machine, the information in the service managing table, and the information in the correspondence table. Subsequently, the master HTTP server 21 transfers the client request to that worker virtual machine for processing.

Figure 11:
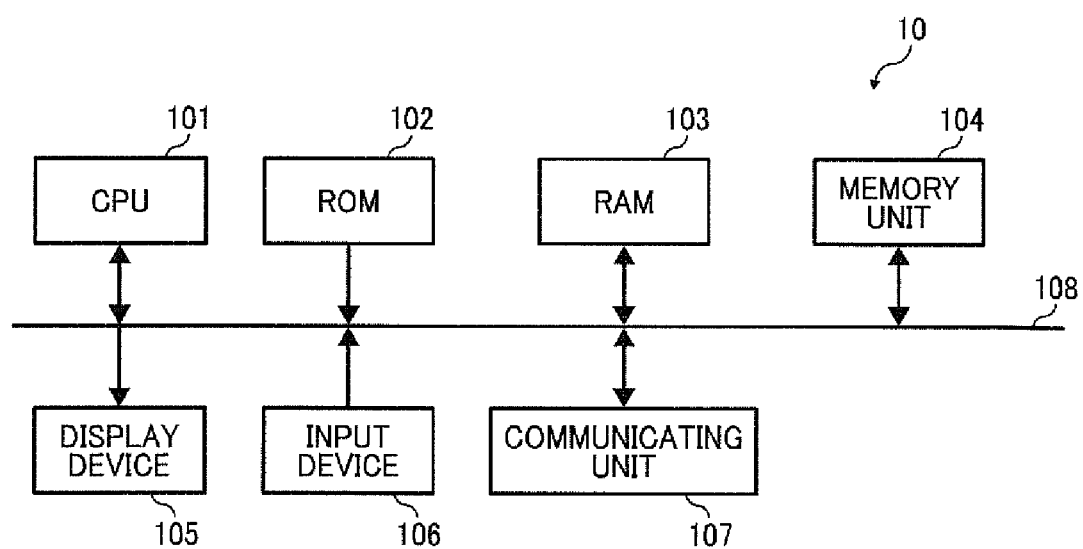
FIG. 11 is a schematic diagram of an exemplary hardware configuration of the information processing apparatus shown in FIG. 1.

FIG. 11 is a schematic diagram of an exemplary hardware configuration of the server 10.

As shown in FIG. 11, the server 10 includes a CPU 101, a read only memory (ROM) 102, the RAM 103, the memory unit 104, a display device 105, the input device 106, a communicating unit 107, and a bus 108. The bus 108 interconnects the other constituent elements of the server 10.

The CPU 101 uses a predetermined area in the RAM 103 as a work area and performs various control operations by executing a variety of control programs stored in advance in the ROM 102 or the memory unit 104. Thus, the operations of the constituent elements of the server 10 are controlled in entirety by the CPU 101.

Moreover, in coordination with predetermined software programs stored in advance in the ROM 102 or the memory unit 104, the CPU 101 implements the master virtual machine 20 and the worker virtual machines 30 and 40 in the server 10.

The ROM 102 is used to store control programs for the server 10 and various setting information in a non-rewritable manner. The RAM 103 is a volatile memory device that functions as a buffer by providing the work area for the CPU 101.

The memory unit 104 is a non-volatile memory device in which data can be recorded magnetically or optically. The memory unit 104 is used to store control programs for the server 10 and various setting information in a writable manner. Moreover, the memory unit 104 is used to store the port managing table, the service managing table, and the correspondence tables.

The display device 105 can be a liquid crystal display (LCD) or a cathode-ray tube (CRT) that is used to display a variety of information based on display signals from the CPU 101. The input device 106 can be entry keys or a pointing device that receives user instructions and outputs an instruction signal to the CPU 101. The display device 105 and the input device 106 can be integratedly configured as a touch-screen.

To sum up, according to the present embodiment, the worker HTTP servers 31 and 41 can determine unique port numbers as internal ports thereof by referring to the port managing table managed by the master HTTP server 21. Thus, when certain port numbers are allocated as external ports for the master HTTP server 21, the worker HTTP servers 31 and 41 can automatically determine corresponding unique internal ports that do not overlap with other port numbers. Such a configuration enables achieving simplicity in managing the port numbers.

Meanwhile, although it is assumed that the internal ports for the worker HTTP servers 31 and 41 are used only for communication with the master HTTP server 21, it is also possible to use the internal ports to enable communication between the worker HTTP servers 31 and 41.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

For example, computer programs necessary to perform the abovementioned operations can be provided in a computer-readable recording medium such as a magnetic disk, an optical disk (compact disk read only memory (CD-ROM), compact disk readable (CD-R), digital versatile disk (DVD), etc.), a magneto optical (MO) disk, or a semiconductor memory in any recording format.

Alternatively, the computer programs can be stored in a computer connected over a network such as Internet and downloaded therefrom.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus that receives information from an external client device including an HTTP client, processes the information, and sends a processing result to the client device, the information processing apparatus comprising:
    a plurality of virtual machines each running an HTTP server, the HTTP server running in one of the virtual machines functioning as a master HTTP server that performs communication with the HTTP client and the HTTP server running in each of remaining virtual machines functioning as a worker HTTP server, the master HTTP server including
        a port number setting unit that receives input settings including a port number to be used in communication with the HTTP client; and
        a port managing unit that manages port management information in a port managing table in which the port number received by the port number setting unit is registered in association with identification information of the master HTTP server and a port number for each of the worker HTTP servers is registered in association with identification information of corresponding worker HTTP server, and
    the worker HTTP server including
        a port determining unit that, by referring to port numbers registered in the port managing table, determines a port number not allocated to any of remaining HTTP servers as an internal port of corresponding worker HTTP server and instructs the port managing unit to register the determined port number in association with identification information of the corresponding worker HTTP server,
    wherein the port managing unit determines whether a port number determined by the port determining unit overlaps with any of the port numbers registered in the port managing table, and
    (i) in a case that none of the port numbers registered in the port managing table matches the port number determined by the port determining unit, the port managing unit registers the port number determined by the port determining unit in association with identification information of the corresponding worker HTTP server in the port managing table, and
    (ii) in a case that one of the port numbers registered in the port managing table matches the port number determined by the port determining unit, the port managing unit notifies the port determining unit of port overlapping, and upon receiving the notification of port overlapping, the port determining unit re-determines a new port number.

2. The information processing apparatus according to claim 1, wherein the port determining unit determines a port number in a random manner.

3. The information processing apparatus according to claim 1, wherein when the port number setting unit receives an alteration in the input settings, the port managing unit updates the port number that has been registered in association with the identification information of the master HTTP server in the port managing table with a port number received in the alteration and deletes the port number registered in association with identification information of each of the worker HTTP servers from the port managing table.

4. The information processing apparatus according to claim 3, wherein the port managing unit deletes, from among the port number registered in association with the identification information of each of the worker HTTP servers, a port number that overlaps with the port number updated according to the alteration.

5. The information processing apparatus according to claim 1, wherein each of the HTTP servers includes a port opening-closing unit that performs opening and closing of a port number registered in association with identification information of corresponding HTTP server from among the port numbers registered in the port managing table.

6. The information processing apparatus according to claim 5, wherein
    the master HTTP server includes a port opening-closing control unit that controls operations of the port opening-closing unit in each of the HTTP servers, and
    the port opening-closing unit in each of the HTTP servers performs opening and closing of a port number according to an instruction from the port opening-closing control unit.

7. The information processing apparatus according to claim 6, wherein
    every time the port opening-closing control unit issues a port opening instruction, the port opening-closing unit in each of the worker HTTP servers makes an inquiry to corresponding port determining unit about a target port number for opening, and
    every time the port opening-closing unit in any one of the worker HTTP servers makes an inquiry about a target port number for opening, corresponding port determining unit determines a port number and, after determined port number is registered in association with corresponding worker HTTP server in the port managing table, notifies the port opening-closing unit of the determined port number.

8. The information processing apparatus according to claim 1, wherein
    each of the virtual machines includes at least one application, and
    the HTTP server running in each of the virtual machines includes an application managing unit that manages application information in which the at least one application in corresponding virtual machine is registered in association with address information of the at least one application and that specifies one of the at least one application to process a request received from the HTTP client by referring to address information specified in the request.

9. The information processing apparatus according to claim 8, wherein the master HTTP server includes a request transferring unit that
    correspondingly holds the application information managed by the application managing unit in each of the worker HTTP servers and identification information of corresponding worker HTTP server, identifies, when a request specifying address information of an application in one of the virtual machines running a worker HTTP server is received from the HTTP client, the one of the virtual machines as destination of the request by referring to the application information, identification information of each of the virtual machines, and the address information specified in the request, and transfers the request to identified virtual machine.

10. The information processing apparatus according to claim 9, wherein the request transferring unit identifies a port number of the worker HTTP server running in the identified virtual machine from the port managing table and transfers the request to that port number.

11. The information processing apparatus according to claim 9, wherein the request transferring unit transfers the request by using HTTP.

12. The information processing apparatus according to claim 8, wherein the master HTTP server includes
a service managing unit that manages service management information in which a port number allocated to each of the worker HTTP servers is registered in association with name of a service provided at that port number; and
a service identifier appending unit that identifies name of a service provided at a port number that is identified to have received a request and appends a service identifier corresponding to identified service name to the request, and
an application performs processing according to the service identifier appended to the request.

13. A method of information processing in an information processing apparatus that includes a plurality of virtual machines each running an HTTP server, the HTTP server running in one of the virtual machines functioning as a master HTTP server that performs communication with an external HTTP client and the HTTP server running in each of remaining virtual machines functioning as a worker HTTP server, the method comprising:
a first process performed by the master HTTP server including
receiving, by a port number setting unit, input settings including a port number to be used in communication with the HTTP client; and
managing, by a port managing unit, port management information in a port managing table in which the port number received by the port number setting unit is registered in association with identification information of the master HTTP server and a port number for each of the worker HTTP servers is registered in association with identification information of corresponding worker HTTP server; and
a second process performed by each of the worker HTTP servers including
determining, by a port determining unit, a unique port number not allocated to any of remaining HTTP servers as an internal port of corresponding worker HTTP server by referring to port numbers registered in the port managing table,
wherein the port managing unit determines whether the unique port number determined in the determining step of the second process overlaps with any of the port numbers registered in the port managing table, and
(i) in a case that none of the port numbers registered in the port managing table matches the unique port number, the port managing unit registers the unique port number in association with identification information of the corresponding worker HTTP server in the port managing table, and
(ii) in a case that one of the port numbers registered in the port managing table matches the unique port number, the port managing unit notifies the port determining unit of port overlapping, and upon receiving the notification of port overlapping, the port determining unit re-determines a new port number.

14. A computer program product comprising computer-readable program codes embodied in a non-transitory computer-usable medium and provided to process information in an information processing apparatus that includes a plurality of virtual machines each running an HTTP server, wherein
the HTTP server running in one of the virtual machines functioning as a master HTTP server that performs communication with an external HTTP client and the HTTP server running in each of remaining virtual machines functioning as a worker HTTP server, and
the program codes when executed causing a computer to execute:
a first process performed by the master HTTP server including
receiving, by a port number setting unit, input settings including a port number to be used in communication with the HTTP client; and
managing, by a port managing unit, port management information in a port managing table in which the port number received by the port number setting unit is registered in association with identification information of the master HTTP server and a port number for each of the worker HTTP servers is registered in association with identification information of corresponding worker HTTP server; and
a second process performed by each of the worker HTTP servers including
determining, by a port determining unit, a unique port number not allocated to any of remaining HTTP servers as an internal port of corresponding worker HTTP server by referring to port numbers registered in the port managing table; and
instructing, by the port determining unit, the port managing unit to register the determined port number in association with identification information of the corresponding worker HTTP server in the port managing table,
wherein the port managing unit determines whether the unique port determined in the determining step of the second process overlaps with any of the port numbers registered in the port managing table, and
(i) in a case that none of the port numbers registered in the port managing table matches the unique port number, the port managing unit registers the unique port number in association with identification information of corresponding worker HTTP server in the port managing table, and
(ii) in a case that one of the port numbers registered in the port managing table matches the unique port number, the port managing unit notifies the port determining unit of port overlapping, and upon receiving the notification of port overlapping, the port determining unit re-determines a new port number.

15. The information processing apparatus according to claim 1, wherein
each of the virtual machines includes at least one application, and
the one of the virtual machines on which the master HTTP server is running maintains priority information based on which the one of the virtual machines selects one of the remaining virtual machines to which a client request is to be transferred, in a case that the client request can be processed by applications installed on more than one of the remaining virtual machines.

* * * * *